April 12, 1949.   N. B. HERMAN   2,466,768
MACHINE TOOL
Filed Oct. 18, 1944   2 Sheets-Sheet 1
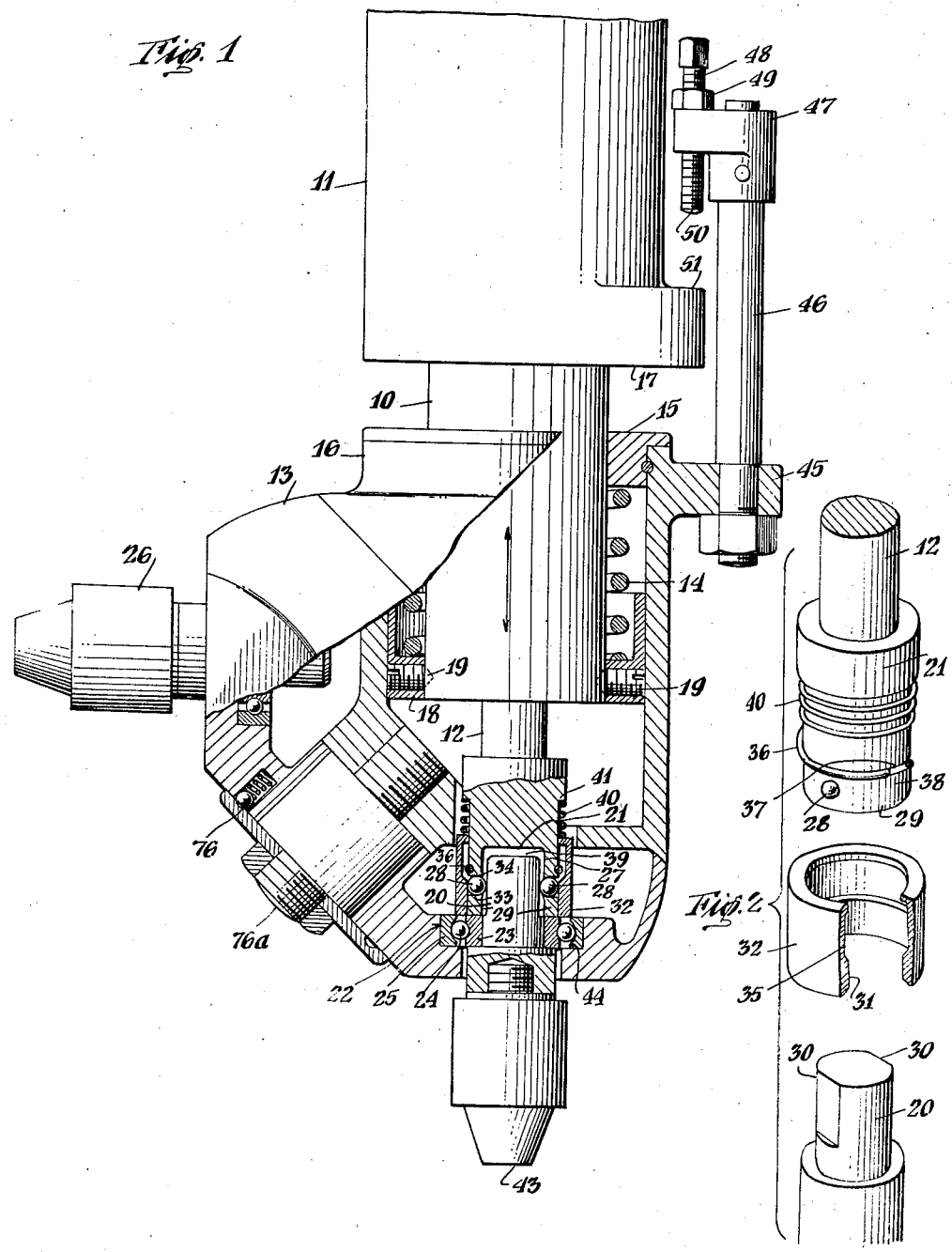
INVENTOR.
Neil B. Herman
BY
Norman T. Holland
ATTORNEY

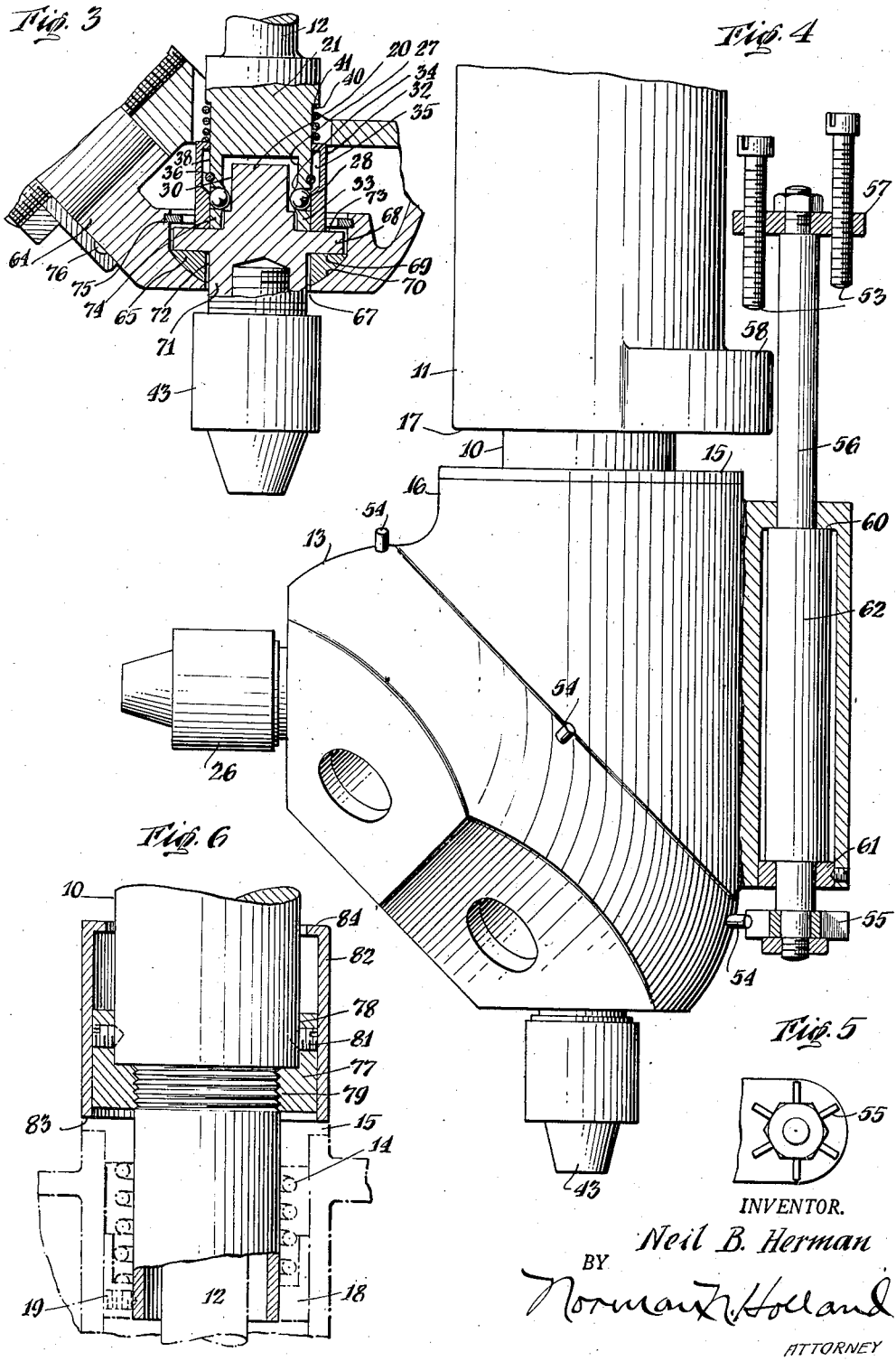

Patented Apr. 12, 1949

2,466,768

UNITED STATES PATENT OFFICE 2,466,768

MACHINE TOOL

Neil B. Herman, New York, N. Y.

Application October 18, 1944, Serial No. 559,311

2 Claims. (Cl. 77—25)

This invention relates to tool-holding units and is herein illustrated in some detail as embodied in a drill-press turret head.

In machine tools of that character, and in some other types of machine tools and devices, much time and money has been expended in an endeavor to produce a machine tool which turns out work of the required precision and at the speed required to show a profit on the capital invested in the machine tool as a whole.

The difficulty in mounting tool holders in a turret arises from the fact that modern precision work demands a high degree of accuracy in the product, and such accuracy depends upon even greater accuracy in the tool mounting, thus adding greatly to the cost of production.

An ordinary machine tool turret often includes as many as six such tool holders or chucks, each turning with the turret to be successively brought into alignment with the drill press spindle and then to be driven by that spindle to operate successively on the work-piece or on work-pieces. Thus, such machine tools have had to be provided with a carefully positioned and aligned turret, and with carefully centered and carefully aligned tool holders or chucks within the turret. This multiple centering and aligning increased in expense and in time consumed with each added tool holder or chuck in the turret. Turrets using frictional drives have not proven satisfactory.

According to the present invention the foregoing and other difficulties and objections are overcome. In the form shown the bearings for the tool holders or chucks need not be accurately aligned but much of the aligning is effected by the driving spindle through a special gripping device.

In the form shown the driving spindle includes a cup within which the end of the tool is free to revolve, but the chuck shank is shown with symmetrically arranged flattened sides extending axially along the space traversed by the cup and the cup is shown as including balls lying in corresponding symmetrically arranged hollows or holes so that when the cup slips well down over the upper end of the tool the projecting faces of the balls jam against the flattened sides of the shank and seize the shank to drive it accurately against the work-piece while aligning it and aligning the tool which it carries. Thus the chuck needs only an end support to approximately hold it in alignment to receive the cup, when the cup is being shifted from idle position to a position where it grasps the tool.

An approximate aligning of the tool may be effected in any of several ways. In one form the tool is carried upon a bearing member which may take the form of a segment of a sphere resting in a spherical surface to which it conforms.

Another suitable approximate aligning device is shown as a ball bearing in which one ball track is struck from a greater radius than the radius of the balls with the result that the tool may be tilted to a considerable angle around its normal axis.

In the form shown the cup and its gripping balls are readily assembled by inserting the balls, and slipping a hardened steel sleeve over the cup, so that the inner face of the sleeve provides a surface against which the balls jam.

The sleeve is easily locked against falling out by expanding a spring ring into an annular inner depression of the sleeve and around the cup so that the spring may be slipped to seat itself in a groove in the cup and may limit movement of the sleeve to the width of the annular groove within which the spring is thick enough to project.

If desired the machine may include an automatic indexing device whereby the step by step rotation of the turret causes pins on the turret to engage a spur wheel so that the spur wh rotates stops on its shaft to control the limit of feed of the respective chucks.

Since the downward movement of the gripping chuck determines the depth of cut made by the tool it is driving, it becomes possible to provide a stop for accurately and automatically arresting the tool at the limit of its desired cut, and this stop may be variably effective for each tool in the turret.

The turret and its drive may take the form of some standard size and adapters may be provided which enable one standard turret and its chucks to be readily attached to drill presses fitted with quills of varying size. The structure is such that the turret may be attached to many forms of single tool drill presses. Thus the turret may convert an ordinary drill press into a multiple drill device.

Other features and advantages and useful objects will hereinafter appear.

In the accompanying drawings:

Fig. 1 is a side view, largely broken away, of a turret and some adjacent parts, showing one form of the present invention;

Fig. 2 is an exploded perspective of the chuck shank end of the spindle, and the sleeve which controls the balls;

Fig. 3 is a side view mostly in section, of the preferred embodiment showing one chuck and its holder in a turret;

Fig. 4 is a side view, partly in section, showing how a turret turns its spur wheel and its limiting stops;

Fig. 5 is a bottom view of the spur wheel; and

Fig. 6 is a sectional side view of an adapter.

In the form shown a usual form of quill 10 is adapted to move up and down in a frame 11. The quill 10 carries the spindle 12 which drives the tool. The quill also carries the turret 13 and its housing 16 by a spring 14. When the quill 10 rises, it lifts the turret 13 until the top 15 of the turret housing 16 strikes the bottom 17 of the frame 11. The quill 10 continues to rise compressing the spring 14 by the thrust collar 18 which is held to the quill 10 by set screws 19, thus withdrawing from the chuck shank 20 the enlarged cup or female member 21 at the end of the spindle 12 until the cup 21 is clear of the chuck shank 20.

The chuck shank 20 is shown, in this form of the invention, as journalled in the turret 13 by means of a ball bearing 22 which includes a race 23 force fitting on the shank 20, balls 24, and a special runway 25, described below, which is fixed in the turret 13.

Thus when the cup 21 is clear of the tool shank 20 the turret 13 may be rotated around the journal 76a in the support 16 to bring another tool 26 below the cup 21.

When the turret has come to rest with its chuck 26 beneath the cup 21 and with the spring-pressed ball 76 in the indentation therefor, the quill 10 is lowered to cause the cup 21 to engage the shank 20.

The cup 21 is shown as having an inner face 27 clear of the chuck shank 20, but it is adapted to drive the chuck shank 20 because symmetrically arranged inwardly projecting hard balls 28 (usually steel), in the cup wall 29 slip down across corresponding flat faces 30 on the shank 20.

When the spindle 12 and its cup 21 rotate on their axis the balls 28 jam between revolving flat faces 30 and the inner face 31 of a hard steel sleeve 32 and thus forcibly align and carry around the chuck shank 20 rotating the tool to do its work.

To effect this rotation of the chuck the balls 28 are carried in small symmetrically arranged openings 33 in the cup 21, and the openings 33 are preferably peened at 34 around their inner faces to prevent the balls from falling out when the cup 21 is withdrawn from the shank 20.

The balls 28 and sleeve 32 are easily assembled to remain in the form shown, because the sleeve 32 is shown with an annular depression 35 that allows the sleeve 32 to be slipped part way on the cup 21, a spring 36 to be sprung open and slipped into the depression 35, and then slipped up until it seats itself in an annular groove 37 in the outer bare face 38 of the cup 21, thus holding the sleeve 32 against slipping off the cup 21.

In order to hold the depression 35 opposite the balls 28 when the cup 21 is free of the shank 20 and thus make it impossible for the balls 28 to become jammed on the top 39 of the cup 21 the sleeve 32 is shown as normally held down by a coil spring 40 encircling the cup 21 and thrusting against an overhanging ledge 41 on the outer cylindrical surface of the cup 21. Thus the chuck shank 20 when the spindle 12 descends passes into the cup 21. As the sleeve 32 is forced upwardly against the spring 40 the balls 28 are formed inwardly to seize the shank 20.

It is possible to economically and accurately locate the opening 33 for the balls 28, to accurately and cheaply cut the face 31 against which they seize, and to accurately and cheaply cut the flat faces 30, with the result that the shank 20 aligns the chuck 43. The descending bottom lip 29 of the cup 21 when it comes to rest against the top of the ball race 23 cooperates to maintain the alignment.

As a further result the outer ball race 25 may have its runway 44 cut on a long radius so that need of accuracy of mounting the race 25 is avoided, since the inner race can tilt on its center if need be, and it need not take much thrust.

The upward travel of the turret 13 with its chucks 43 and 26 is limited by frame 11 as was mentioned above. To limit the downward travel whereby to limit the cut of a tool in the chuck 43, the turret housing 16 includes a side lug 45 on which is mounted post 46 carrying a bracket 47. A set screw 48, provided with a lock nut 49, is adjustable in the bracket to determine at what height the lower end 50 of the set screw will strike the lug 51 on the frame 11 and thus arrest the turret 13 and tool in the chuck 43 in their downward travel.

In the form shown in Fig. 4 the turning of the turret, which may be either manual or automatic, is adapted to automatically vary the point at which any one of a number of set screws 53 like the set screw 50 will selectively arrest the downward movement of the turret 13.

In the simple form shown in Fig. 4 the turret 13 carries a pin 54 for each of the series of chucks 26 or 43, so that as the turret turns the pins 54 turn a spur wheel 55 and its shaft 56 in steps corresponding to the rotation of the turret. The shaft 56 carries at the upper end a plate 57 into which are threaded the set screws 53, one for each of the series of chucks 26 and 43, and the set screw 53 corresponding to the chuck 26 or 43 in use temporarily overlies a lug 58 on the machine frame 11 like the lug 45, so that the descending turret chuck 43 is arrested when the lug 58 engages the set screw 53 which overlies it.

In order to cause the shaft 56 to move up and down with the turret housing 16, the carrier is shown as provided with an upper and a lower thrust bearing 60 and 61 adapted to receive the end thrust of a cylindrical enlargement 62 of the shaft 56 and hold it against any endwise movement. Thus the shaft 56, through the set screws 53 is enabled to accurately control the limit of feed of each tool.

The preferred embodiment of mounting for the chucks 43 in a turrent 64, is shown in Fig. 3. In the form shown there the spindle 12 terminates in a cup 21, like the cup 21 of Fig. 1, and like that cup seizing and aligning the shank 20 of a chuck 43 by balls 28 which jam between flat sides 30 on the shank 20 and its sleeve 32.

The shank 20, however, is carried upon a bearing member 65, journalled on the inner segmental spherical face 70 which surrounds the opening 67 through which the chuck 43 projects from the turret 13.

To journal the chuck 43 the shank 20 includes an integral flat faced flange 68 adapted to bear against and turn upon the upper flat face 69 of the bearing member 65. Thus the surface 69 forms a flat bearing for the chuck 43 with sufficient space about the periphery of the part 68 to allow lateral movement to facilitate adjustment.

The lower segmental spherical face 70 of the bearing member 65 permits a universal movement of the chuck 43 in addition to the lateral movement which enables the ball 28 and cup 21 to accurately align it.

To permit such universal movement the flange 68 is shown as terminating short of the outer edge of the bearing member 65, and the neck 71 of the shank is shown as standing clear of the opening 72 in the bearing member 65 through which it passes.

A retaining ring 75 above the flange 68 and mounted in the turret 64 serves to prevent the chuck from falling out when the turret has turned to point the chuck 43 upward.

To index the successive chucks 43 under the shaft 12, the turret is shown as positioned on its housing 16 by a ball detent device 76 adapted to position each of the chucks 43 to be engaged and driven by the shaft 12.

To enable a standard form and size of the turret to fit many sizes and types of drill presses, the turret mounting may include an adapter (Fig. 6) including an adapter collar 77 having a bore 78 fitting around the end of the quill 10 and having a lip 79.

The lip 79 is shown as threaded to receive a short, downwardly projecting extension quill 80 which is screwed into it to form the mounting for the thrust collar 18 and thus support the turret 13 by the spring 14.

To hold the collar 77 in place it is shown as held by set screws 81 which disappear within it and bear against the quill 10.

A slidable sleeve 82 extends about the collar 77 and is adapted to engage the turret housing 16 and compress its supporting spring 14, when the quill 10 and spindle 12 are raised, to release the chuck shank. When the sleeve 82 engages the frame 11, continued upward movement of the quill forces the lower end of the sleeve against the surface 15 of the housing 16 to compress the supporting spring 14 thus separating the cup 21 from the end 20 of the chuck shank.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described certain embodiments of the invention in considerable detail, what is claimed is:

1. In a machine of the class described, the combination of a frame, a quill slidable in the frame, a turret, a spring tending to carry the turret with the quill, and a spindle sliding with the quill, an adapter including a collar secured to the quill, a removable extension quill having a different diameter than said first-mentioned quill and threaded into a bore in the collar, and a removable sleeve slidable on the collar adapted to strike a bottom piece in the press frame as the turret rises to permit the sleeve to arrest the turret while the quill continues to rise with the spindle.

2. In a machine of the class described, the combination of a frame, a quill slidable in the frame, a turret, a spring tending to carry the turret with the quill, and a spindle sliding with the quill, an adapter including a collar secured to the quill, a removable extension quill having a different diameter than said first-mentioned quill and threaded into a bore in the collar, and a slidable sleeve closely embracing the collar and guided thereby adapted to strike a part of the press frame as the turret rises to thus arrest upward movement of the turret while the quill continues to rise with the spindle.

NEIL B. HERMAN.

REFERENCES CITED

The following references are of record in the file of this patent:

UNITED STATES PATENTS

| Number | Name | Date |
| --- | --- | --- |
| 853,570 | Wagaman | May 14, 1907 |
| 1,124,981 | Weaner | Jan. 12, 1915 |
| 1,288,351 | Wood | Dec. 17, 1918 |
| 1,457,511 | Evans | June 5, 1923 |
| 1,973,064 | Gwinn | Sept. 11, 1934 |
| 2,364,631 | Grimes | Dec. 12, 1944 |
| 2,368,009 | Drane | Jan. 23, 1945 |